United States Patent [19]

Rudish

[11] Patent Number: 5,220,683
[45] Date of Patent: Jun. 15, 1993

[54] ULTRA-WIDEBANDWIDTH COMPRESSIVE RECEIVER

[75] Inventor: Ronald M. Rudish, Commack, N.Y.

[73] Assignee: AIL Systems, Inc., Deer Park, N.Y.

[21] Appl. No.: 749,687

[22] Filed: Aug. 26, 1991

[51] Int. Cl.$^5$ .............................................. H04B 1/16
[52] U.S. Cl. ............................... 455/146; 324/76.35; 455/304; 455/313
[58] Field of Search ................ 455/72, 131, 145, 146, 455/140, 272, 273, 276.1, 280, 281, 303, 304, 313; 324/77 B, 77 C, 77 D, 77 G, 77 H; 375/96

[56] References Cited

U.S. PATENT DOCUMENTS

| | | | |
|---|---|---|---|
| 3,991,419 | 11/1976 | Thomas | 455/313 |
| 4,270,209 | 5/1981 | Albanese | 375/96 |
| 4,797,950 | 1/1989 | Rilling | 455/304 |
| 4,991,015 | 2/1991 | Stepp | 455/137 |
| 5,168,214 | 12/1992 | Engeler et al. | 324/77 G |

OTHER PUBLICATIONS

Microwave Receiver With Electronic Warfare Applications James Bao-Yen Tsui, Chapter 8 entitled Compressive (Microscan) Receivers, John Wiley & Son, New York.

Primary Examiner—Reinhard J. Eisenzopf
Assistant Examiner—Chi H. Pham
Attorney, Agent, or Firm—Hoffman & Baron

[57] ABSTRACT

An ultra-widebandwidth compressive receiver includes a power divider for processing a composite input signal consisting of individual input signals. The power divider provides a plurality of power divided signals to corresponding nondispersive delay lines. Each nondispersive delay line generates a unique time delay for each power divided composite signal. The unique time delay is generated in accordance with an arithmetic progression. The unique time delay has the effect of altering the phase of a corresponding individual input signal. The time delayed composite signals are provided to a frequency converter which heterodyne mixes them with local oscillator signals of frequencies which are a base frequency plus multiples of a reference signal frequency. The result is provided to a power combiner which re-combines the time delayed and frequency converted individual input signals in order to generate a group of narrow signal pulses that are separated in time according to their frequency.

7 Claims, 3 Drawing Sheets

ULTRA-WIDEBANDWIDTH COMPRESSIVE RECEIVER

BACKGROUND OF THE INVENTION

1. Field of the Invention

Generally, this invention relates to compressive receivers and more particularly to compressive receivers that are not limited in instantaneous bandwidth by the bandwidth characteristics of the delay lines.

2. Description of Prior Art

A compressive receiver is a wideband receiver capable of fine-frequency resolution and processing of numerous electrical signals that are simultaneously provided to the receiver. Traditional channelized receivers differ from compressive receivers in that simultaneously received signals processed by channelized receivers are outputted in parallel whereas simultaneously received signals processed by compressive receivers are converted to time-compressed pulses outputted in series in the order of their signal frequency. By measuring the position of each relatively narrow signal pulse provided by the compressive receiver with respect to time, the frequency of each input signal can be determined. Since the group of relatively narrow signal pulses is compact and each pulse is relatively close timewise to adjacent pulses, high speed logic circuits are required to process the electrical signal pulses produced by compressive receivers.

Compressive receivers have the ability to separate a multitude of input signals having different frequencies even if the input signals overlap. Traditional research and development efforts concerning compressive receivers have concentrated on the use of local oscillators (LO's) and dispersive delay lines (DDL's), specifically surface acoustic wave (SAW) DDL's, to process input signals to obtain outputs consisting of relatively narrow compressed signals which approximate single pulses. However, compressive receivers which utilize SAW DDL's are limited in the instantaneous bandwidth of the input signal by the bandwidth of the DDL's. This limitation is currently between one gigahertz and two gigahertz. In other words, traditional SAW DDL compressive receivers may not be capable of processing input signals having frequencies above two gigahertz.

OBJECTS AND SUMMARY OF THE INVENTION

It is an object of the present invention to provide a compressive receiver which utilizes nondispersive delay line elements and a frequency converter consisting of mixers and a local oscillator in order to increase the instantaneous bandwidth capability of the receiver and enable processing of input signals with frequencies above two gigahertz.

It is another object of the present invention to provide a compressive receiver which has the capability to adaptively change its output pulse shape.

It is another object of the present invention to provide a compressive receiver which overcomes inherent disadvantages of known compressive receivers.

In accordance with one form of the present invention, an ultra-widebandwidth compressive receiver includes a power divider, one or more nondispersive delay lines, a frequency converter and a power combiner.

More specifically, the ultra-widebandwidth compressive receiver of the present invention includes one or more power dividers for dividing a composite input signal consisting of one or more individual input signals having different frequency, amplitude and/or phase components into a plurality of divided signals, each identical to the composite input signal but lower in amplitude because of the power division. Thus each divided signal is a composite of one or more divided individual input signals. Each power divider has at least one input port and a plurality of output ports.

A plurality of nondispersive delay lines are coupled in succession to each output port of the power divider. The number of delay lines corresponds to the number of power divider output ports. Each of the plurality of divided signals is simultaneously provided to a corresponding delay line. Each delay line that receives a divided signal component performs a time delay operation thereon. The time delay produced by a corresponding delay line is generated in accordance with an arithmetic progression or incrementation starting from a base time delay at the first delay line and adding a common difference time delay at each successive delay line. Therefore as the number of successive delay lines increases, the length of each successive time delay increases. As a result, even though the power divider simultaneously provides the plurality of divided signals to corresponding delay lines, the delay lines non-simultaneously provide corresponding time-delayed signals. The progressive time delay generated by the delay lines applies a phase shift to each individual input signal. The extent of the phase shift is dependent on the amount of time delay and on the frequency of each individual input signal of the divided composite signal that is being time delayed.

The ultra-widebandwidth compressive receiver also includes a frequency converter operatively coupled to each delay line. The frequency converter receives the time-delayed signals and heterodyne mixes them with local oscillator signals to provide frequency converted output signals. The local oscillator signals are generated in a phase-coherent manner with frequencies in accordance with an arithmetic progression or incrementation. The progression of local oscillator signal frequencies causes each frequency-converted output signal to be translated in frequency by a small but progressive amount. The effect is equivalent to adding phase shifts to each frequency converted signal. These phase shifts linearly increase with time. Coupled to the outputs of the frequency converter is a power combiner which receives the frequency converted output signals, combines corresponding individual input signals and provides a combined output signal. The individual input signals that are in phase at a particular instant of time will add while those that are not in phase will partially add or cancel. As a result of the addition of phase shifted and frequency converted individual input signals, the power combiner will provide an output signal which generally consists of a group of pulses that are separated in time in accordance with the different frequencies of the individual input signals.

These and other objects, features and advantages of this invention will be apparent from the following detailed description of illustrative embodiments thereof, which is to be read in connection with the accompanying drawings.

DETAILED DESCRIPTION OF THE PREFERRED EMBODIMENTS

Figure 1:
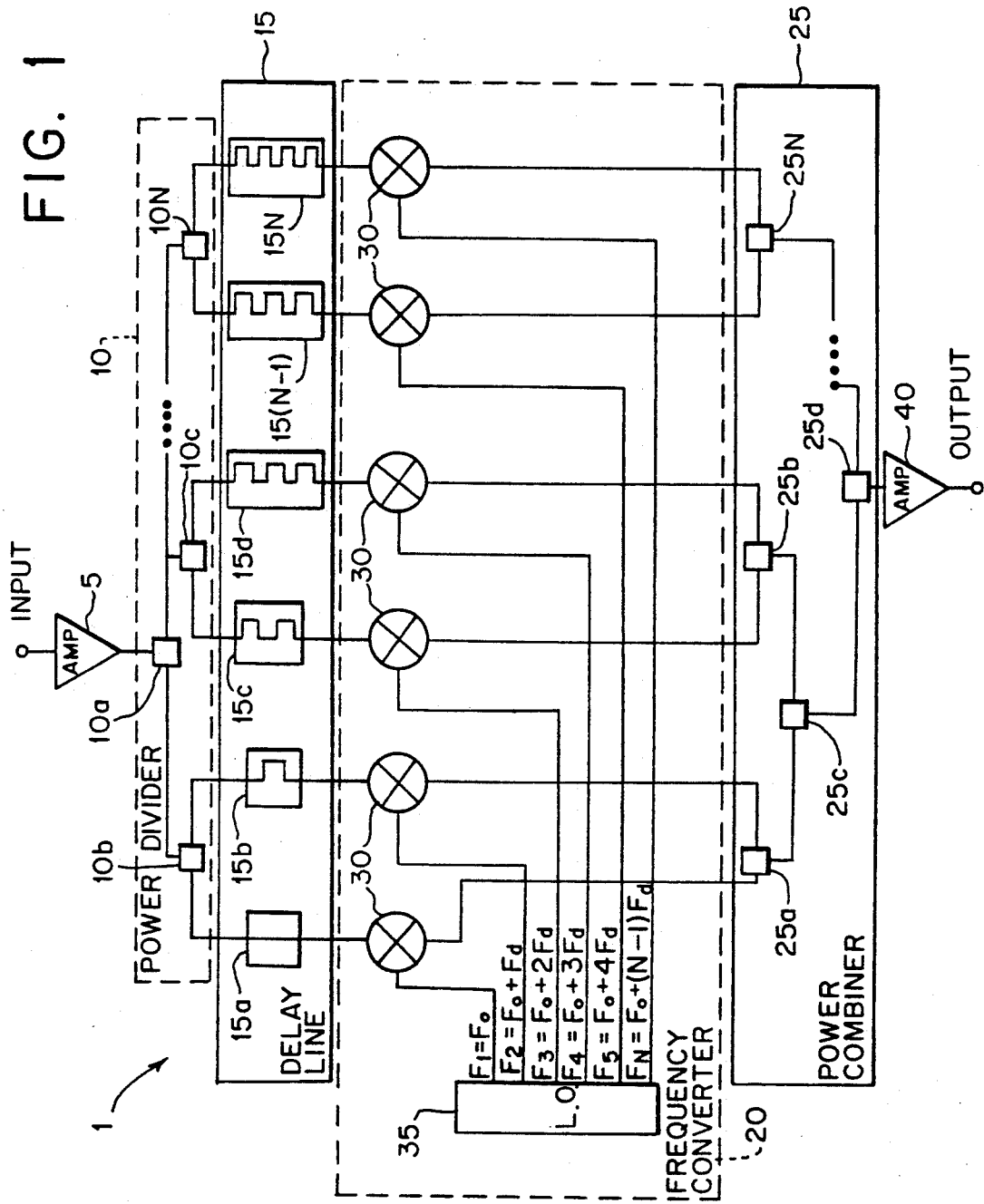
FIG. 1 is a functional block diagram of one form of the ultra-widebandwidth compressive receiver formed in accordance with the present invention.

Referring now to FIG. 1 of the drawings, a preferred form of an ultra-widebandwidth compressive receiver 1 constructed in accordance with the present invention will now be described. The compressive receiver 1 is designed to provide an increase in the instantaneous bandwidth capability over conventional compressive receivers so as to permit time compression of individual input signals even if the individual input signals have frequencies separated by more than two gigahertz.

The ultra-widebandwidth compressive receiver 1 shown in FIG. 1 basically includes a power divider 10, a plurality of nondispersive delay lines 15, a frequency converter 20 and a power combiner 25.

The compressive receiver 1 preferably includes an amplifier 5 for increasing the strength of a composite input signal before it is provided to the power divider 10. The amplifier 5 is operatively coupled to the input port of the compressive receiver and the power divider 10.

As mentioned previously, the compressive receiver includes one or more power dividers 10 for receiving and dividing the composite input signal which includes one or more individual input signals having different frequency, amplitude and/or phase components. The composite input signal is divided by the power divider 10 into a plurality of divided signals which are replicas of the composite input signal, but at a lower amplitude. Each power divider 10 has at least one input port that receives the composite input signal. In addition, each power divider 10 has a plurality of output ports with at least one output port for each divided signal. The plurality of output ports corresponds to the maximum number of divided signals that can be generated by the power divider means 10. Furthermore, each power divider 10 may include one or more individual power dividers 10a, 10b, 10c–10N.

Preferably included and coupled to the power divider 10 are one or more successive delay lines 15. Each delay line 15 is electrically coupled to a corresponding output port of the power divider 10. Each delay line 15 generates a unique time delay for each divided signals that is received from the power divider 10. The delay line 15 provides time-delayed signals to the frequency converter 20. Each unique time delay that is generated by the delay line 15 is proportioned in accordance with an arithmetic progression from a base time delay and is incremented by a common difference time delay $t_o$. According to the preferred embodiment of the present invention, the first delay line 15a, which is the delay line that provides the least amount of delay (base time delay), will produce zero time delay. However, each successive delay line 15 will produce a time delay equivalent to a multiple of the common difference time delay $t_o$. Therefore, assuming that the second delay line 15b produces a time delay equivalent to $t_o$, a third delay line 15c would produce a $2t_o$ time delay, a fourth delay line 15d would produce a time delay equal to $3t_o$ and so on to the Nth delay line 15N which would generate a time delay of $(N-1)t_o$.

The progressive time delay generated by each delay line 15 will cause a corresponding progressive phase shift of each time-delayed individual input signal. It is known that phase shift is both frequency and delay-time dependent. Therefore, each delay line 15 will generate different phase shifts corresponding to the signal frequency of each individual input signal within each divided composite signal. As a result of the phase shifts produced by the delay lines 15, each individual input signal will be partially in phase with some individual input signals and partially out of phase with other individual input signals.

As described, the frequency converter 20 is coupled to each delay line 15. Preferably, the frequency converter 20 receives and processes the time delayed signals provided by the delay line 15. The converter heterodyne mixes local oscillator signals with each time delayed signal. This causes a linearly time varying phase shift of the time delayed signals. As a result, the frequency converter 20 provides a plurality of frequency converted signals of varying phase shift.

The frequency converter 20 may include one or more signal mixers 30 and a local oscillator 35. Each signal mixer 30 is operatively coupled to a corresponding delay line 15 for receiving corresponding time delayed signals. In addition, each signal mixer 30 is operatively coupled to the local oscillator 35. Furthermore, each signal mixer 30 has an output port coupled to the power combiner means 25 in order to provide frequency converted signals to the power combiner.

In the preferred embodiment, the local oscillator 35 is coupled to each signal mixer 30. The local oscillator 35 generates a plurality of local oscillator signals that are derived from a reference signal frequency $F_d$. Preferably, the local oscillator 35 generates the local oscillator signals by adding multiples of the reference signal frequency $F_d$ to a base signal frequency $F_o$. A first local oscillator signal will have a frequency $F_1$ and a second local oscillator signal will have a frequency $F_2$. Frequency $F_1$ is equivalent to the base signal frequency $F_o$ and $F_2$ is equivalent to the base signal frequency $F_o$ plus the reference signal frequency $F_d$ added thereon. A progression of multiples is followed such that a third local oscillator signal $F_3$ has a frequency of $(F_o+2F_d)$ and a fourth local oscillator signal $F_4$ has a frequency of $(F_o+3F_d)$. The series is continued for every local oscillator signal that is generated and provided to a corresponding signal mixer 30. The local oscillator signals that are generated and provided to the signal mixers 30 are combined with corresponding time-delayed signals received from corresponding delay lines.

In addition to the above-identified arithmetic progression of the local oscillator signal frequencies, it should be noted that each local oscillator signal is coherent with every other local oscillator signal such that once every cycle of the reference signal frequency ($F_d$), all of the local oscillator signals ($F_1, F_2, F_3 \ldots F_n$) have coinciding zero crossings.

In an alternative embodiment, the frequency converter 20 can be replaced with a series of phase shifters with each phase shifter being coupled to a delay line 15 and to power combiner means 25. The phase shifters can be automatically or manually manipulated so that the amount of phase shift will change over time. The amount of phase shift produced is independent of the incoming signal frequency but increases in a linear progression in accordance with the delay line supplying the signal. The frequency converter 20 containing signal mixers is the preferred form of the invention if the time varying phase shift cycle repeats very often. However, for lower frequency bands including audio and sonar, the alternative embodiment which includes the phase shifters would be preferred.

The compressive receiver 1 also preferably includes a power combiner 25 coupled to the frequency converter 20. The power combiner may consist of one or more individual power combiners 25a, 25b, 25c, 25d-25N. The power combiner 25 receives and combines the frequency converted signals supplied by the frequency converter 20. The power combiner 25 provides a combined output signal by vectorially adding corresponding individual input signals of the divided delayed composite signals from each of its inputs. By combining, individual input signals which have been phase shifted add or cancel depending on the relative phase of each individual input signal at a specific instant in time. The individual input signals that are in phase will add while those that are not in phase will partially add or cancel. The addition and cancellation produces an output which substantially represents a single pulse for each individual input signal, the time of occurrence of that pulse being dependent on the frequency of the original unconverted individual input signal.

The compressive receiver may also include an amplifier 40 operatively coupled to the power combiner 25 and the output of compressive receiver. The amplifier 40 serves to increase the strength of the combined output signal before it is supplied to the output port of the compressive receiver.

If it is desired, the combined output signal can be viewed on a display apparatus, for example, as a plot of combined output signal amplitude vs. time. A peak signal pulse is obtained only at the time when all of the phase shifted and frequency converted components corresponding to a specific individual input signal are in phase. The time of peak amplitude will be proportional to the specific individual input signal frequency, allowing the time axis of the display to be labelled in terms of a frequency coordinate. Individual input signals having different frequencies will be displaced along this axis in accordance with their frequencies.

It has been shown that without weighting the constituent signal components, each combined output signal pulse will be Sin X/X in shape. In addition, the width of the pulse depends on the number of samples that are plotted. Accordingly, if the composite input signal is to be power divided N ways, the pulse width to the 3.9 dB point will be 1/NFd seconds. In view of the above, it is possible to resolve N equally frequency-spaced signals that are simultaneously input to the ultra-widebandwidth compressive receiver.

An alternative explanation of the function of the frequency converter 20 and power combiner 25 is that they generate the frequency spectral components of a compressed repetitive output signal. In this case, the frequency converter and power combiner convert the single line frequency spectrum of the CW input signal to the wideband multiline spectrum of the compressed repetitive sampling pulse which is delivered at the output of the ultra-wide-bandwidth compressive receiver. Each heterodyne mixer output provides one of the spectral lines. All of the lines are combined by the power combiner 25 to form the Sin X/X sampling pulse shape observed in the time domain. Having separate access to individual spectral lines (frequency domain) is useful for shaping the output pulse (time domain) and reducing its sidelobes, as will be elaborated upon later in connection with alternate forms of this invention. In the case of pulsed input signals, the frequency converter and power combiner perform in a similar manner, forming the spectra of highly compressed pulse outputs.

Figure 2:
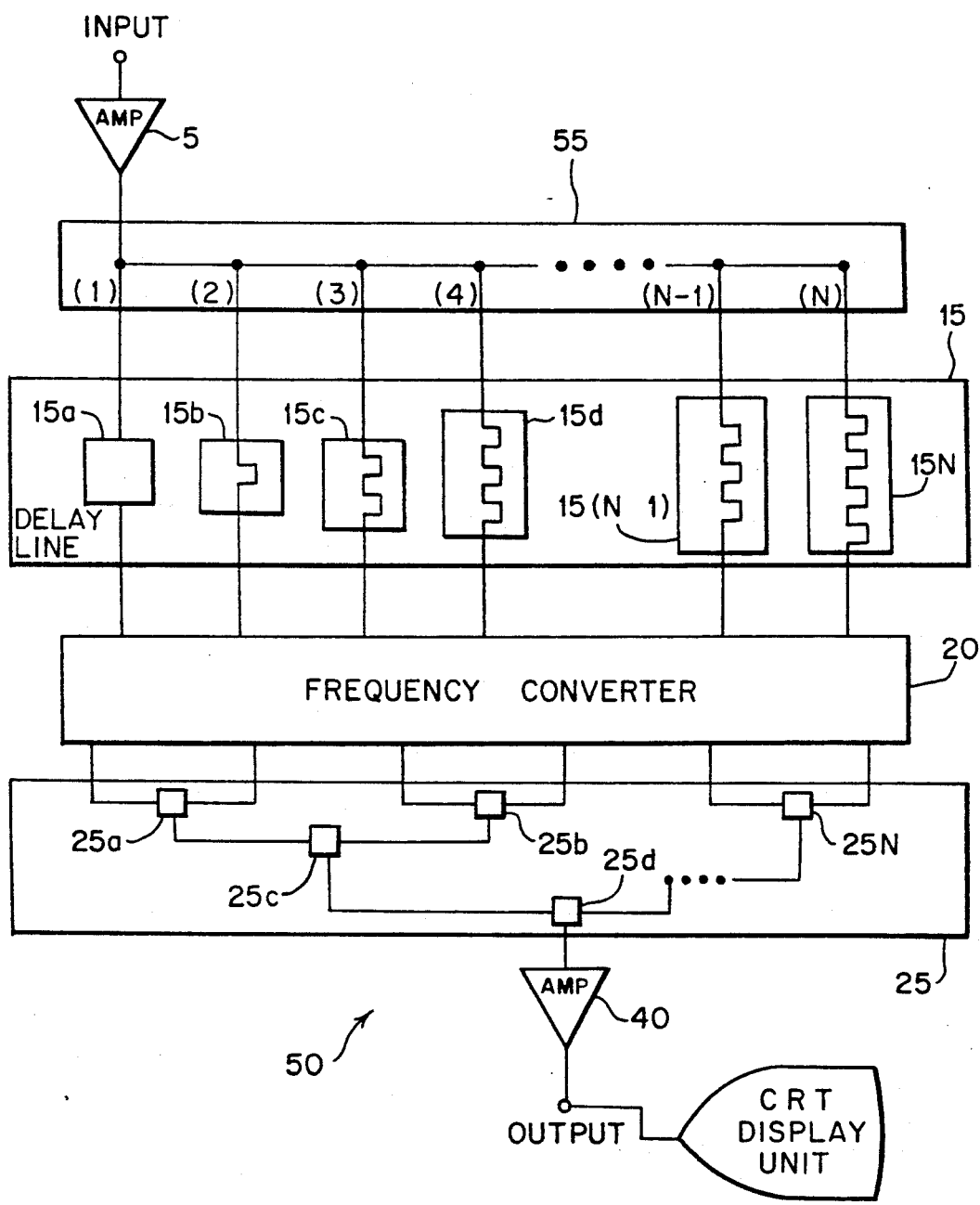
FIG. 2 is a functional block diagram of an alternate form of the ultra-widebandwidth compressive receiver formed in accordance with the present invention.

Referring now to FIG. 2, an alternate form of the ultra-widebandwidth compressive receiver 50 formed in accordance with the present invention is shown. As shown in FIG. 2, the power divider and delay lines may be replaced by a tapped delay line 55. The compressive receiver 50 basically includes one or more tapped delay lines 55 having at least one input port and a plurality of delayed signal paths to a plurality of output ports. The tapped delay line 55 receives and processes the composite input signal consisting of one or more individual input signals having different frequency, phase and/or amplitude components and generates a plurality of divided and delayed composite signals which are applied to its plurality of outputs. The tapped delay line 55 generates a unique time delay for each of its signal paths. As stated with regard to FIG. 1, each unique time delay generated by the tapped delay line 55 is proportioned in accordance with an arithmetic progression so that each individual time delay is a multiple of a common difference time delay $t_o$. The tapped delay line 55 provides time-delayed signals to the frequency converter 20 as explained with reference to FIG. 1. The remaining operation and description of the compressive receiver is similar to that previously described.

Figure 3:
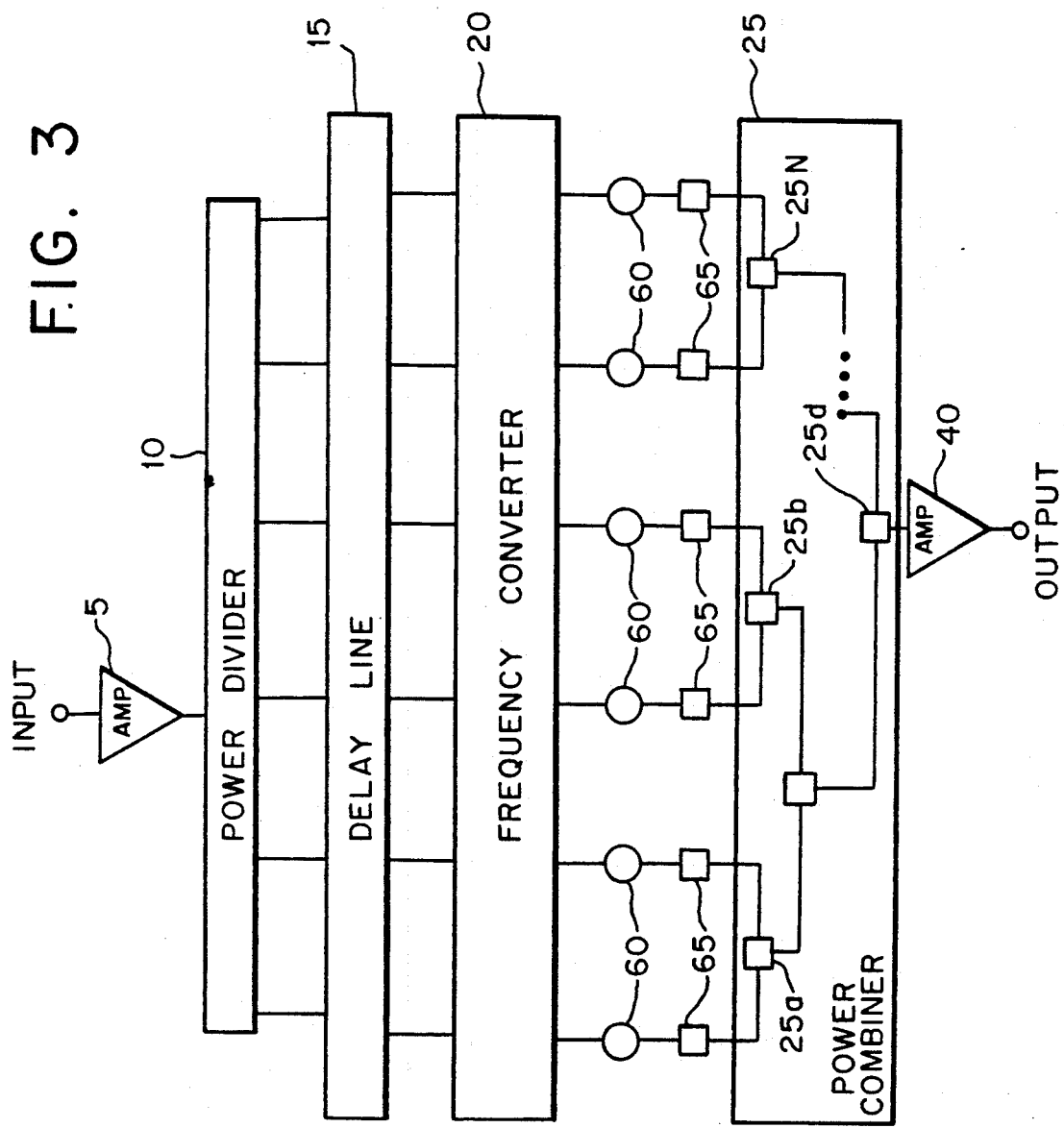
FIG. 3 is a functional block diagram of another form of the ultra-widebandwidth compressive receiver formed in accordance with the present invention.

Referring now to FIG. 3, an alternative embodiment of the present invention is shown. The ultra-widebandwidth compressive receiver may also include one or more signal attenuators 60 that are operatively coupled to the frequency converter 20. The signal attenuators 60 receive corresponding frequency converted signals from the frequency converter 20. Before and after the peak of each pulse output by the power combiner are residual signals commonly referred to as side lobe signals. The side lobe signals represent portions of the time-delayed and frequency converted signals corresponding to individual input signals which do not entirely cancel at the output of the power combiner 25. The signal attenuators 60 reduce the amplitude of the side lobe signals by weighting and adjusting the amplitude of the frequency spectral distribution of signals applied to the power combiner 25.

The compressive receiver of the present invention may also include one or more phase shifters 65. Each phase shifter is operatively coupled to the frequency converter 20. The phase shifters 65 receive the frequency converted signals and alter the phases of the frequency spectral distribution of signals applied to the power combiner 25. By altering the phase as well as weighting the amplitudes of the spectral distribution, it is possible to tailor the shape of the output pulse.

Signal attenuators 60 and/or phase shifters 65 provide means to adjust the amplitude and/or phase of the spectral distribution adaptively during operation as well as the initial alignment of the ultra-widebandwidth compressive receiver. It should be noted that the ability to adaptively weight amplitude and/or phase and therefore adaptively shape the output signal is a valuable feature of the ultra-widebandwidth compressive receiver. This function is not readily performed with traditional compressive receivers.

In addition, the values of the differential time delays produced by both the delay line and the tapped delay line are short enough so that it is possible to configure and build the entire ultra-widebandwidth compressive receiver on a single GaAs chip.

The length of the nondispersive differential delay is chosen to provide a $2\pi$ phase change from one end of the input signal frequency band to the other. For example, for a system covering the 5 GHz to 10 GHz instantaneous bandwidth, a delay line having 2.36 inches in electrical length will be one wavelength at 5 GHz and two wavelengths at 10 GHz. This will produce a differential phase change of $2\pi$ over the 5 GHz to 10 GHz frequency range. Thus, if the first delay line has zero length, then the second delay will have an electrical length of 2.36 inches, the third delay line will have an electrical length of 5.72 inches and the longest delay line would be $N-1$ times 2.36 inches in electrical length (where N is the number of delay lines). It should be noted that if the input signal frequency is in a frequency band higher than 10 Ghz, then the length of the delay line would be even shorter.

The differential delay length can be chosen to produce a $K(2\pi)$ phase change from the low end to the high end of the signal frequency band. In the expression $K(2\pi)$, K is an integer larger than one. Therefore, K pulses could be obtained for each signal in the 1/Fd time period for a sweep or repetition. As a result, each pulse would be narrowed by a factor of K but there would be K ambiguities or side lobe signals which would need resolution. This could be accomplished by a second ultra-wideband compressive receiver operating with $K=1$. The advantage to having a $K(2\pi)$ phase change is that a steeper slope of the frequency vs. time relationship is obtained which provides a greater degree of accuracy in determining the frequency of the input signal.

The operation of the ultra-widebandwidth compressive receiver constructed in accordance with the present invention will now be described. The compressive receiver 1 receives the composite input signal consisting of one or more independent input signals having different frequency, amplitude and/or phase components. The composite input signal is provided to amplifier 5 for composite input signal amplification. After amplification, the composite input signal is provided to power divider 10. The power divider 10 divides the composite input signal into two or more divided composite components.

Each divided composite signal that is generated is provided to corresponding delay lines 15a–15N of the delay line 15. In the preferred embodiment, a first delay line 15a does not delay the corresponding divided composite signal while a second delay line 15b produces a single unit of time delay equivalent to the common difference delay $t_o$ of an arithmetic progression. A third delay line 15c produces a two unit time delay equal to $2t_o$. The arithmetic progression of the delay continues for every delay line that receives a divided composite signal from the power divider 10. As previously stated, the arithmetic progression of the delay will cause a corresponding progressive phase shift of each individual input signal across the array of delay line outputs. As the frequency of the independent input signals vary, the amount of phase shift for each independent input signal will also vary. Therefore, each time-delayed independent input signal which is outputted from the delay lines will be phase shifted by an amount which depends both on the frequency and position within the array of outputs.

The time-delayed signals are provided to the frequency converter 20. The frequency converter 20 includes one or more signal mixers 30 and a local oscillator 35. The local oscillator 35 generates and provides local oscillator signals to corresponding signal mixers 30. The local oscillator signal which is provided to the signal mixer receiving the time-delayed signal from delay line 15a is considered the first local oscillator signal while the local oscillator signal that is provided to the signal mixer receiving the time delayed signal from delay line 15b is the second local oscillator signal. This nomenclature continues to the Nth local oscillator signal that is generated.

The local oscillator signals are generated by adding multiples of a reference (offset) signal frequency $F_d$ to a base frequency $F_o$. As previously stated, the first local oscillator signal will have a frequency equivalent to the base frequency $F_o$ and the second local oscillator signal will have a frequency equal to $(F_o+F_d)$ while the third local oscillator signal will have a frequency equal to $(F_o+2F_d)$. Each oscillator signal that is generated is provided to a corresponding signal mixer. The frequency offsets generate relative local oscillator phase shifts which vary linearly in time and in position along the array of signal mixers. Each signal mixer combines the time-delayed signal provided by corresponding delay lines with corresponding local oscillator signals to provide frequency converted output signals. The phase shifts of the local oscillator signals and those of the time-delayed signals applied to the signal mixers are added together by the frequency conversion process and the phase shifted sums are reproduced on the frequency-converted signals.

The power combiner 25 combines all of the signals outputted by the frequency converter 20. By combining the frequency converted signals, individual input signals which have been phase shifted by the compressive receiver will add and cancel depending on the relative phase of each individual input signal at a specific instant in time. A signal approximating a group of pulses representing the plurality of individual input signals will be separated and outputted according to the frequency of the individual input signal.

Although illustrative embodiments of the present invention have been described with reference to the accompanying drawings, it is to be understood that various changes and modifications may be effected by one skilled in the art without departing from the scope or spirit of the invention.

What is claimed is:

1. An ultra-widebandwidth compressive receiver comprising:
   power divider means for processing a composite input signal and providing a plurality of power divided composite signals, the power divider means having at least one input port for receiving the composite input signal, the power divider means having a plurality of output ports corresponding to the plurality of power divided composite signals;
   a plurality of nondispersive differential delay elements, each of the plurality of nondispersive differential delay elements being coupled to a corresponding output port of the power divider means, each of the plurality of nondispersive differential delay elements generating a unique time delay for each of the plurality of power divided composite signals, each unique time delay being proportioned in accordance with an arithmetic progression, each of the plurality of nondispersive differential delay elements providing time delayed composite signals;

a frequency converter coupled to the plurality of nondispersive differential delay elements, the frequency converter receiving the time delayed composite signals, the frequency converter processing the time delayed composite signals by mixing each time delayed composite signal with a corresponding one of a plurality of local oscillator signals of frequencies which are a base frequency plus multiples of a reference signal frequency, the frequency converter providing a plurality of frequency converted signals; and power combiner means for receiving and combining the plurality of frequency converted signals, the power combiner means being coupled to the frequency converter, the power combiner means providing a power combiner output signal substantially in the form of a group of narrow compressed signal pulses.

2. An ultra-widebandwidth compressive receiver as defined by claim 1, wherein the frequency converter includes:
   a plurality of signal mixers, each of the plurality of signal mixers being coupled to a corresponding nondispersive differential delay element, each of the plurality of signal mixers receiving the time delayed composite signals, each of the plurality of signal mixers also being coupled o the power combiner, the plurality of signal mixers providing the plurality of frequency converted signals to the power combiner; and
   a local oscillator signal generating means, the local oscillator signal generating means being coupled to each of the plurality of signal mixers, the local oscillator signal generating means generating the plurality of local oscillator signals, each of the plurality of local oscillator signals being derived from the reference signal frequency, each of the plurality of local oscillator signals having a frequency which is equal to a multiple of the reference signal frequency added to the base signal frequency, each of the plurality of local oscillator signals being provided to a respective mixer of the plurality of signal mixers.

3. An ultra-widebandwidth compressive receiver as defined by claim 1, which further comprises display apparatus coupled to the power combiner output for receiving and displaying the power combiner output signal.

4. An ultra-widebandwidth compressive receiver as defined by claim 1, wherein the group of narrow compressed signal pulses includes a plurality of side lobe signals, the plurality of side lobe signals being located adjacent to each narrow compressed signal pulse, the ultra-widebandwidth compressive receiver further comprising a plurality of signal attenuators operatively coupled to the frequency converter, each of the plurality of signal attenuators receiving a corresponding frequency converted signal, the plurality of signal attenuators weighting the frequency spectral distribution of the group of narrow compressed signal pulses and the plurality of side lobe signals to reduce the amplitude of the plurality of side lobe signals.

5. An ultra-widebandwidth compressive receiver as defined by claim 1, wherein the group of narrow compressed signal pulses includes a plurality of side lobe signals, the plurality of side lobe signals being located adjacent to each narrow compressed signal pulse, the ultra-widebandwidth compressive receiver further comprising a plurality of phase shifters coupled to the frequency converter, each of the plurality of phase shifters receiving frequency converted signals, the plurality of phase shifters altering the phase of the frequency spectral distribution of the group of narrow compressed pulses and the plurality of side lobe signals to obtain pulse shaping.

6. An ultra-widebandwidth compressive receiver comprising:
   at least one tapped nondispersive differential delay element, the at least one tapped nondispersive differential delay element having at least one input port and a plurality of output ports, the at least one tapped nondispersive differential delay element processing a composite input signal and providing a plurality of power divided composite output signals corresponding to the plurality of output ports, the at least one tapped nondispersive differential delay element generating a unique time delay for each of the plurality of power divided composite signals, each unique time delay being proportioned in accordance with an arithmetic progression, the at least one tapped nondispersive differential delay element providing time delayed composite signals;
   a frequency converter coupled to each of the plurality of output ports of the at least one tapped nondispersive differential delay element, the frequency converter receiving the time delayed composite signals, the frequency converter processing the plurality of time delayed composite signals by mixing each time delayed composite signal with a corresponding one of a plurality of local oscillator signals of frequencies which are a base frequency plus multiples of a reference signal frequency, the frequency converter providing a plurality of frequency converted signals; and
   a power combiner coupled to the frequency converter, the power combiner receiving and combining the plurality of frequency converted signals, the power combiner providing a power combiner output signal consisting of a group of narrow compressed signal pulses.

7. An ultra-widebandwidth compressive receiver as defined by claim 6, wherein the frequency converter includes:
   a plurality of signal mixers, each of the plurality of signal mixers being coupled to a corresponding output port of the tapped nondispersive differential delay element, each of the plurality of signal mixers receiving the time delayed composite signals, each of the plurality of signal mixers also being coupled to the power combiner, the plurality of signal mixers providing the plurality of frequency converted signals to the power combiner; and
   a local oscillator signal generating means, the local oscillator signal generating means being coupled to each of the plurality of signal mixers, the local oscillator signal generating means generating the plurality of local oscillator signals, each of the plurality of local oscillator signals being derived from the reference signal frequency, each of the plurality of local oscillator signals having a frequency which is equal to a multiple of the reference signal frequency to the base frequency, each of the plurality of local oscillator signals being provided to a corresponding signal mixer.

* * * * *